US010638169B2

(12) United States Patent
Su et al.

(10) Patent No.: US 10,638,169 B2
(45) Date of Patent: Apr. 28, 2020

(54) CODEC TECHNIQUEST FOR FAST SWITCHING WITHOUT A SYNCHRONIZATION FRAME

(71) Applicant: Apple Inc., Cupertino, CA (US)

(72) Inventors: Yeping Su, Sunnyvale, CA (US); Chris Y. Chung, Sunnyvale, CA (US); Xiaosong Zhou, Campbell, CA (US); James Oliver Normile, Las Altos, CA (US); Hsi-Jung Wu, San Jose, CA (US); Thomas Jansen, Cupertino, CA (US); Hyeonkuk Jeong, Saratoga, CA (US); Joe S. Abuan, San Jose, CA (US); Douglas Scott Price, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/845,287

(22) Filed: Dec. 18, 2017

(65) Prior Publication Data

US 2018/0109824 A1    Apr. 19, 2018

Related U.S. Application Data

(62) Division of application No. 13/800,905, filed on Mar. 13, 2013, now Pat. No. 9,900,629.

(51) Int. Cl.
*H04N 7/12* (2006.01)
*H04N 21/2343* (2011.01)
(Continued)

(52) U.S. Cl.
CPC . *H04N 21/234372* (2013.01); *H04N 21/2381* (2013.01); *H04N 21/23439* (2013.01); *H04N 21/4384* (2013.01); *H04N 21/44004* (2013.01)

(58) Field of Classification Search
CPC ............. H04N 21/234372; H04N 21/2381
(Continued)

(56) References Cited

U.S. PATENT DOCUMENTS 6,909,743 B1 * 6/2005 Ward ............... H04N 21/23406
348/473
7,965,771 B2 6/2011 Wu et al.
(Continued)

FOREIGN PATENT DOCUMENTS

CN        1574972 A    2/2005
CN      101523908 A    9/2009
(Continued)

OTHER PUBLICATIONS

Invitation to Pay Additional Fees, dated Aug. 21, 2014, from corresponding International Application No. PCT/US2014/018285, filed Feb. 25, 2014.
(Continued)

*Primary Examiner* — Richard T Torrente
(74) *Attorney, Agent, or Firm* — BakerHostetler

(57) ABSTRACT

A video streaming method for transitioning between multiple sequences of coded video data may include receiving and decoding transmission units from a first sequence of coded video data. In response to a request to transition to a second sequence of coded video data, the method may determine whether a time to transition to the second sequence of coded video data can be reduced by transitioning to the second sequence of coded video data via an intermediate sequence of coded video data. If the time can be reduced, the method may include receiving at least one transmission unit from an intermediate sequence of coded video data that corresponds to the request to transition, decoding the transmission unit from the intermediate sequence, and transitioning from the first sequence to the
(Continued)

second sequence via the decoded transmission unit from the intermediate sequence.

28 Claims, 8 Drawing Sheets

(51) Int. Cl.
*H04N 21/2381* (2011.01)
*H04N 21/438* (2011.01)
*H04N 21/44* (2011.01)

(58) Field of Classification Search
USPC .................................................. 375/240.25
See application file for complete search history.

(56) References Cited

U.S. PATENT DOCUMENTS

| | | | |
|---|---|---|---|
| 8,249,113 B2 | 8/2012 | Zhang et al. | |
| 2003/0138043 A1 | 7/2003 | Hannuksela | |
| 2004/0160974 A1 | 8/2004 | Read et al. | |
| 2007/0130596 A1* | 6/2007 | Wirick | H04N 7/17318 |
| | | | 725/90 |
| 2007/0174880 A1* | 7/2007 | Fite | H04N 21/23424 |
| | | | 725/87 |
| 2009/0066852 A1 | 3/2009 | Dai et al. | |
| 2010/0036964 A1 | 2/2010 | Cedervall et al. | |
| 2010/0118938 A1* | 5/2010 | Fuchs | H04L 65/607 |
| | | | 375/240.12 |
| 2011/0061084 A1* | 3/2011 | Bejerano | H04H 20/82 |
| | | | 725/109 |
| 2011/0109810 A1* | 5/2011 | Li | H04N 5/4401 |
| | | | 348/731 |
| 2011/0161517 A1 | 6/2011 | Ferguson | |
| 2011/0219063 A1* | 9/2011 | Park | H04N 21/47202 |
| | | | 709/203 |
| 2011/0255535 A1 | 10/2011 | Tinsman | |
| 2012/0163476 A1* | 6/2012 | Gautier | H04N 5/50 |
| | | | 375/240.26 |

FOREIGN PATENT DOCUMENTS

| | | |
|---|---|---|
| CN | 101753973 A | 6/2010 |
| CN | 102057593 A | 5/2011 |
| EP | 1487215 A2 | 12/2004 |
| EP | 2395754 A1 | 12/2011 |
| KR | 2004-0077792 A | 9/2004 |
| KR | 2013-0024571 A | 3/2013 |
| WO | 2009/133427 A1 | 11/2009 |
| WO | 2010/069427 A1 | 6/2010 |
| WO | 2011/102791 A1 | 8/2011 |
| WO | 2013/098317 A1 | 7/2013 |

OTHER PUBLICATIONS

International Search Report and Written Opinion, dated Nov. 21, 2014, from corresponding International Application No. PCT/US2014/018285, filed Feb. 25, 2014.

* cited by examiner

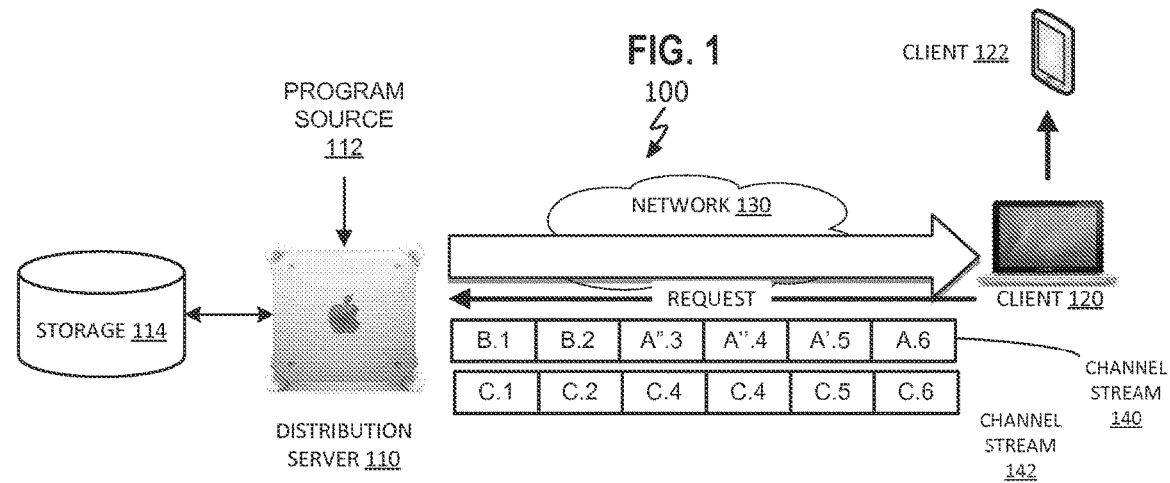
FIG. 1
100
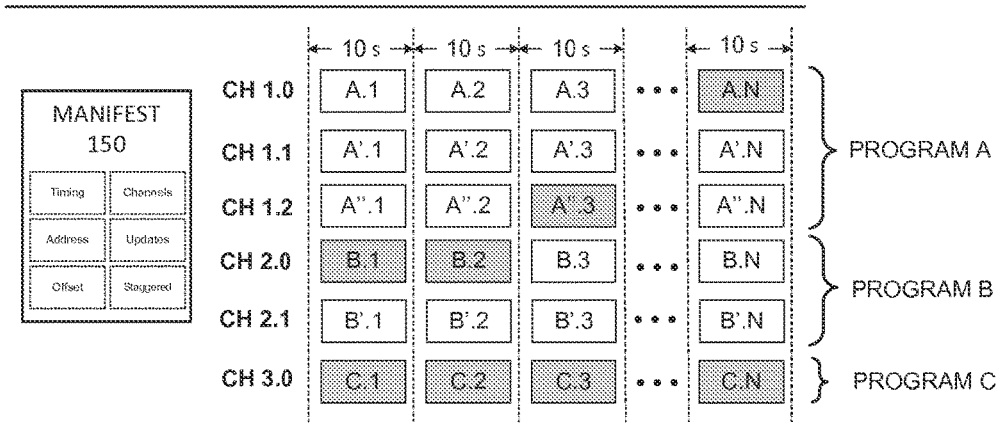
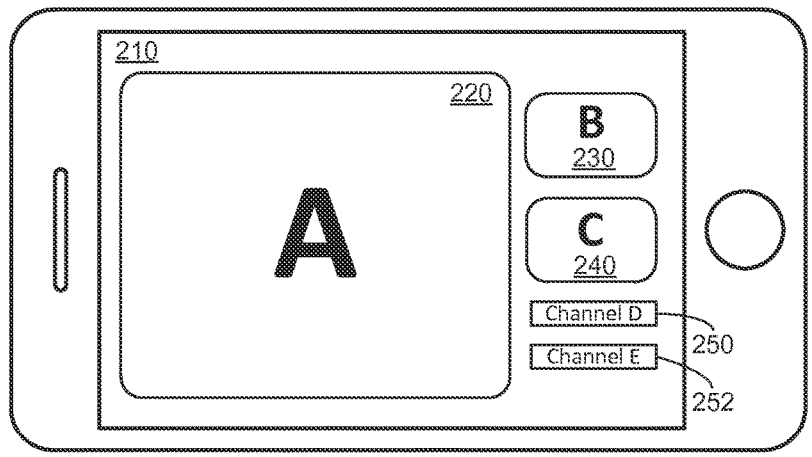
FIG. 2
200

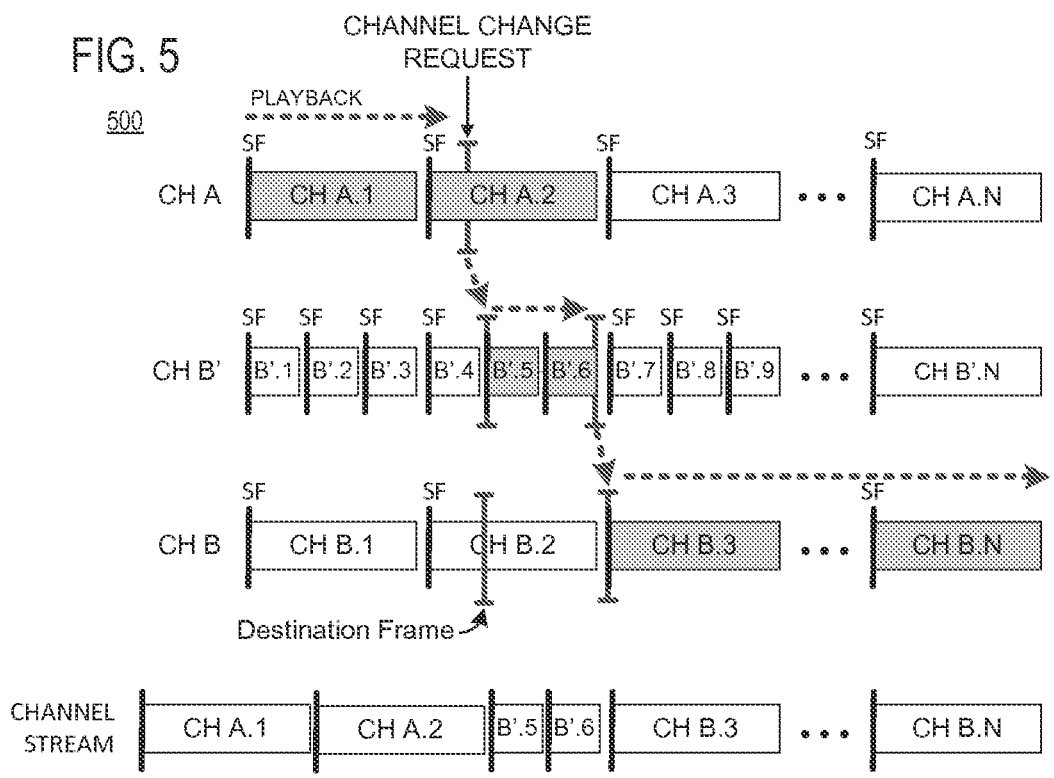
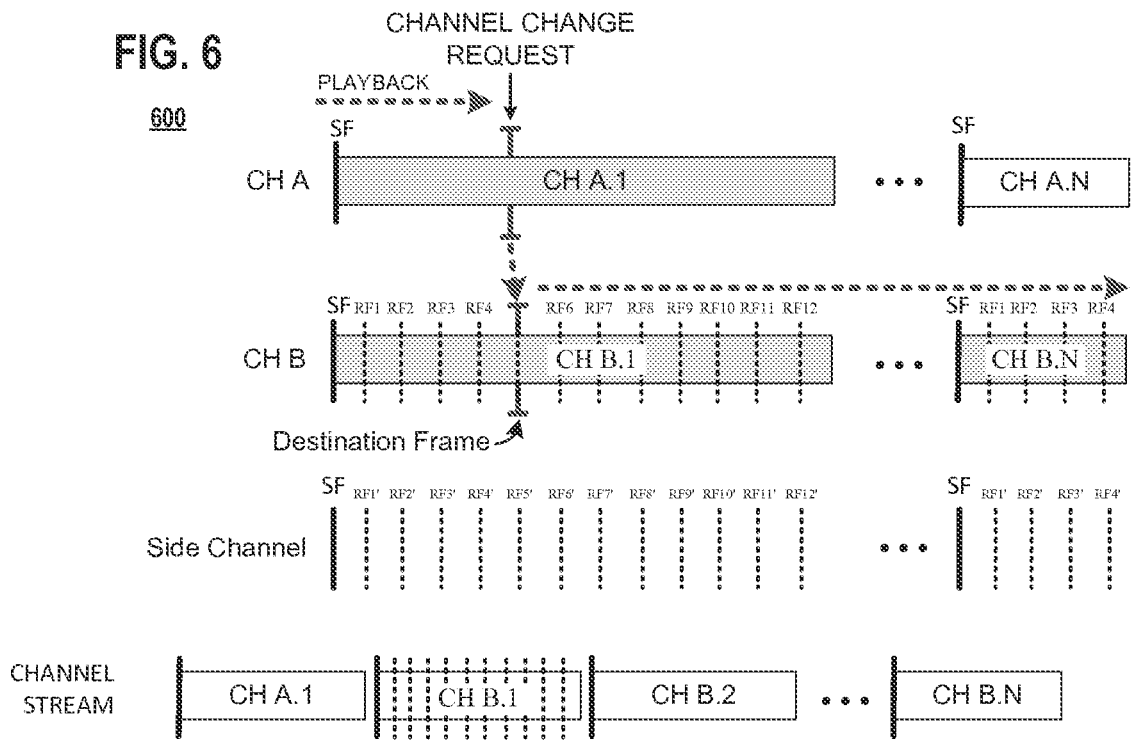

1100

CODEC TECHNIQUEST FOR FAST SWITCHING WITHOUT A SYNCHRONIZATION FRAME

BACKGROUND

This disclosure relates generally to the field of video streaming techniques. More specifically, this disclosure relates to reducing codec-related latency in channel switching for video streaming.

Portable devices increasingly are being utilized to watch traditional programs (e.g., movies, news, and live broadcasts). The programs are encoded and transmitted over wireless or wired networks to distribution devices (e.g., cable boxes) and/or portable devices (e.g., smart phones, laptops or tablets). The programs are typically encoded and sent over the networks in coded data set parsed into chunks (e.g., "transmission units").

The chunks may include one or more reference frames and a plurality of frames that are encoded based on the reference frames. The chunks may include an index frame (I-frames) that is encoded without using information from any other frames, predictive frames (P-frames) that express differences from the content present in the index frame, and bidirectional frames (B-frames) that express differences from the index frame and the predictive frames that occur before and after the bidirectional frame. The frames in the chunks may occur in an order that is different from the order in which the content represented by the frames in chunks should be presented.

To display the video, the device receiving the chunks will buffer the chunk and decode the frames in the chunk for display. The decoding may include converting each frame into the original frame and arranging the frames in the correct order. While the user may observe a delay at the beginning of a video segment due to the buffering and decoding, because the chunks are received and decoded continuously one right after another, the delay due to the buffering and decoding is not observed during regular playback.

However, when a user makes a request to transition to a video source in a new channel, there is a delay associated with switching to the new video source. The contributing factors to the delay may include, network latency, buildup of bit stream buffer, decoding latency and display latency. During this delay the user may observe a gap in the video display. To reduce the gap some methods continue to display the content of the original video source until the video content of the new chunk is ready to be displayed. Other methods, to reduce the buffer and/or decoding latency, transition at a time when the index frame of the chunk is encountered in the new video source. However, these methods do not transition at the time that the user makes the request. In addition, when using these methods on live streaming content, the delay causes content of the new video source to be missed.

A similar delay may also be observed when transitioning between low and high resolution sources of the same video content. When transitioning between the same content, existing methods skip or replay a portion of the content due to the delay.

Accordingly, there is a need for techniques to reduce the delay when transitioning between multiple channels during video streaming.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

FIG. 1 is a simplified block diagram of a video distribution system suitable for use with the present disclosure.

FIG. 2 illustrates an exemplary display of a client device receiving video content according to an embodiment of the present disclosure.

FIG. 5 illustrates a method to transition from a first channel to a second channel using an intermediate channel according to another embodiment of the present disclosure.

FIG. 6 illustrates a method to transition from a first channel to a second channel using reference frames within chunks of the data stream according to an embodiment of the present disclosure.

DETAILED DESCRIPTION

Figure 3:
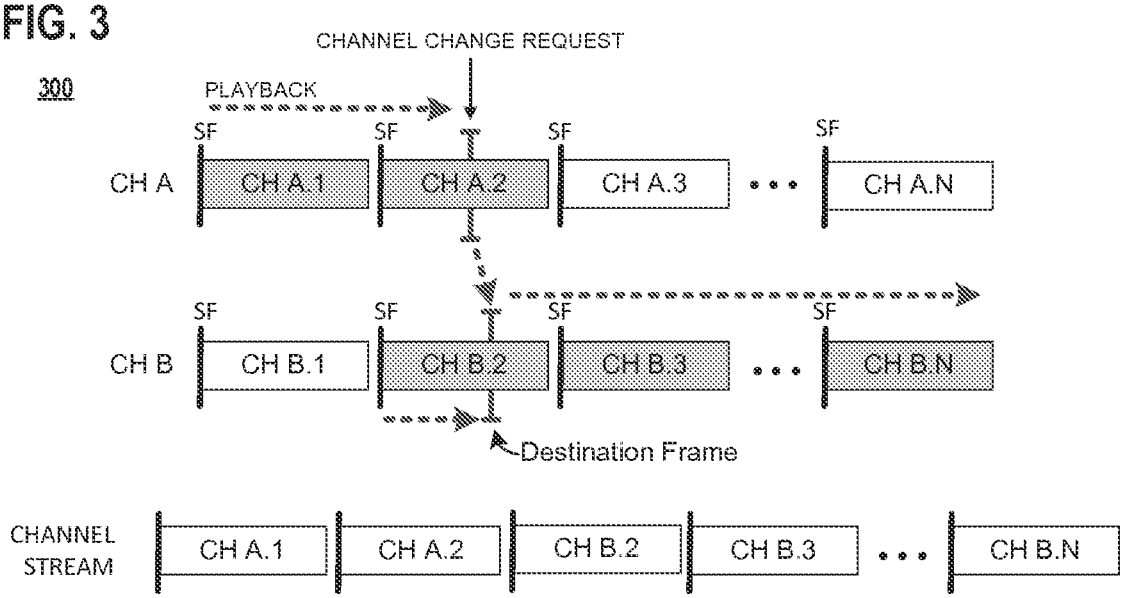
FIG. 3 illustrates a method to transition directly from a first channel to a second channel according to an embodiment of the present disclosure.

Embodiments of the present invention provide techniques and devices for transitioning between multiple sequences of coded video data. A video streaming method may include receiving transmission units from a first sequence of coded video data and decoding the transmission units from the first sequence. In response to a request to transition to a second sequence of coded video data, the method may receive transmission units from the second sequence of coded video data and decode the transmission units from the second sequence. Decoding the transmission units from the second sequence may include buffering a selected transmission unit from the second sequence that includes a frame corresponding to the request to transition, decoding reference frames of the selected transmission unit up to the frame that corresponds to the request to transition, without decoding the non-reference frames, and decoding all of the frames following the frame that corresponds to the request.

Embodiments of the present invention for transitioning between multiple sequences of coded video data may include transitioning to the requested sequence via one or more intermediate sequences of coded video data. The transition to the requested sequence via the intermediate sequences can reduce the transition delay.

FIG. 1 is a simplified block diagram of a video distribution system 100 suitable for use with the present invention. The system 100 may include a distribution server system 110 and a plurality of client devices 120, 122 connected via a communication network 130. The distribution server 110 may receive a variety of video content items (e.g., movies, television shows and other motion picture content) from a program source 112 and/or a storage system 114 for download by the client device 120 or 122. The video content may include one or more live shows that are available for distribution by the distribution server 110 to one or more client devices 120, 122.

The distribution server 110 may process the video content and provide several copies of the video content items as coded video streams, each of which are coded at a respective bit rate, frame rate and/or frame size. The video streams may be parsed into a plurality of chunks (e.g., transmission units or GOPs, but is not so limited) of the coded video representing video content of a predetermined duration (e.g., 5 or 10 seconds). The example of FIG. 1 illustrates three different video programs A, B and C that are available for transmission to the client devices 120 or 122. One or more of the video programs A, B and C may be a live show. Each of the video programs may be processed by the distribution server 110 to provide the program using different bit rate, frame rate and/or frame size or video items that are offset in time. For example, the content of program A may be provided in channels 1.0, 1.1 and 1.2, each corresponding to an encoded video with different parameters.

The distribution server 110 may provide the client device 120 or 122 with information about the available programs and/or channels in, for example, a manifest file 150. Based on this information, the client device 120 or 122 may select a particular program and/or channel to receive over the network 130. The selection of the program and/or channel may be made by the user or by the client device in response to a user command or changing condition (e.g., changes in network bandwidth or processor availability of the device). When a request for a new program and/or channel is issued, the client device 120, 122 or the distribution server 110 may determine how to transition from the current channel being transmitted to the client 120 to the requested channel. In making the determination the client device 120, 122 or the distribution server 110 may select which channels and chunks of the channels should be sent to the client device 120, 122.

Transitioning from one channel to another channel may include utilizing one or more intermediate channels having different bit rate, frame rate and/or frame size or channels that are offset in time. For example, as shown in FIG. 1, if a request is received to transition from channel 1.0 to channel 2.0, the transitioning may include transmitting at least portions of intermediate channel 1.1 and channel 1.2 in the channel stream 140. Utilizing the additional channels for the transition may reduce a gap in the programming during the transition from channel 1.0 to channel 2.0.

As shown in FIG. 1, multiple channel streams 140 and 142 may be provided to the client device 120 or 122. Channel stream 140 may provide video content that is different from the video content of channel stream 142. Channel stream 142 may provide video content as a preview using a low video quality of the available program that can be provided with a high quality.

The manifest file 150 may store an index of the available programs and channels, associate the coded video streams with the programs, and correlate chunks of each coded video stream with corresponding chunks of the other video streams. The manifest file 150 may include details of each available channel and a web address to the channels or for each chunk in the channel. The manifest file 150 may be updated to maintain an updated index of the available programs and channels. The manifest file 150 may be provided to the client device 120, 122 upon request or at predetermined intervals. Manifest files may store syntactic elements representing various types of data.

Embodiments of the present invention are directed to transitioning from one video source to another video source in response to a request from the client device 120 or 122. The request may be initiated by a user or may be provided in response to changed conditions of the transmission network or conditions of the client device 120 or 122.

The transition methods may be utilized by one or more of the distribution server, and the client devices 120 and 122. In one embodiment, the distribution server 110 may use one or more of the transitioning methods to decide which channels should be sent to the client device 120 or 122 to process the transition. In another embodiment, the distribution server 110 may perform the transitioning methods and re-encode the video that includes the transition from one channel to another channel. The data may be re-encoded with one chunk including the transition and the data from the two channels. Alternatively, the data may be re-encoded with one chunk including data up to the transition request and the next chunk including data after the transition request.

The client device 120 or 122 may use one or more of the below discussed transitioning methods to transition from one channel to another channel. The client device 120 or 122 may send a request to the distribution server 110 that includes the channels that the client device 120 or 122 needs to process the request according the transitioning methods discussed below. In another embodiment, the client device 120 may receive all of the channels over the network 130 and function as a local distribution device for the client device 122.

FIG. 2 illustrates an exemplary display 210 of a client device 200 receiving video content according to an embodiment of the present invention. The display 210 may include one or more display windows 220, 230, 240 to accommodate different video content. The display 210 may also include labels 250, 252 with references to other available channels (e.g., channel D and channel E) that do not display the video content. Display window 220 may display a first video content A that is provided with high quality. Display windows 230 and 240 may display a second video content B and a third video content C, respectively, with, for example, a lower quality. For example, display windows 230 and 240 may display a lower quality video that are provided as a preview of video content that can be received with higher quality if user makes such a selection.

The video content displayed in display windows 220, 230, 240 may be received from one or more distribution servers. Each of the video content displayed in display windows 220, 230, 240 or referenced by labels 250, 252 may be live video content. One or more of the video content may be prerecorded video content stored on the distribution server. The different video content displayed or referenced in the display 210 may correspond to a live broadcast of a show being captured with different cameras, each providing a different perspective of the live broadcast.

A user of the client device 200 may make selections as to which video content to display in the display windows 220, 230, 240 of the display 210. For example, the user may make a selection on the client device 200 to display in the display widow 220, one of the video content currently being provided as a preview in display window 230 or 240. In response to the selection, the distribution server may receive two requests. A first request to transition from a low resolution to a high resolution of the video content being provided in display windows 230 or 240 and a second request to transition from a high resolution to a low resolution of the video content being provided in the display window 220.

In response to the requests, the distribution server may change the channel from which the chunks are provided to each of the channel streams sent to the client device 200. To reduce the switching latency, while maintaining good quality during the transition, the distribution server may utilize one or more transition methods discussed below. The transition method from one channel to another channel may utilize one or more intermediate channels to reduce the latency at the client 200. Using the chunks of different channels the client device 200 may buffer and decode the chunks of each channel according to transition method discussed below to reduce the buffering and/or decoding latency.

FIG. 3 illustrates a method to transition directly from a first channel to a second channel according to an embodiment of the present invention. FIG. 3 illustrates transitioning from channel A, parsed into chunks CH A.1-A.N, to channel B, parsed into chunks CH B.1-B.N. Channel A may represent the channel currently being sent by a distribution server to the client device and channel B may represent the channel to which the distribution server and/or the client device will transition in response to a request.

As shown in FIG. 3 the request to transition from channel A to channel B may be received when a synchronization frame of channel B does not align with the request. To avoid waiting until the next synchronization frame SF of channel B to transition to channel B, the transition may be initiated immediately by buffering and decoding channel B up to a destination frame that is approximately aligned with the request. The client may already be receiving channel B at the time of the request or, alternatively, may issue the request to receive channel B in response to the request.

To display the content of channel B at approximately the time that the request is received, the decoder receiving channel B may determine which chunk (e.g., chunk CH B.2) is aligned with the request, buffer the chunk CH B.2 and rapidly decode the data in the chunk up to the transition point using the synchronization frame. Buffering the chunk may include buffing only a portion of the chunk up to the frame corresponding to the request. The speed of the decoding can be increased by skipping the decoding of the frames up to the frame that is aligned with the transition point and/or request.

In one embodiment, only the reference frames of the chunk up to the destination frame may be decoded and all of the frames may be decoded following the destination frame. The reference frame may include all of the frames that are needed to decode the frame that corresponds to the request and frames following this frame. The reference frames that are decoded may include all of the I-frames and/or P-frames.

The first frame of each chunk may be coded as a synchronization frame SF that can be decoded without reference to any previously-coded frame of the video sequence. The synchronization frame SF may be coded as an intra-coded frame (colloquially, an "I frame"). For example, if the video sequence is coded according to the H.265 coding protocol, the synchronization frame may be coded as an Instantaneous Decoder Refresh frame (IDR frame). Other coding protocols may provide other definitions of synchronization frames.

While the synchronization frames SF are shown at the beginning of each chunk in FIG. 3, the synchronization frames may be located at other locations within the chunk. In addition, the synchronization frames SF across the different channels (e.g., A and B) may be aligned. In other embodiments, the synchronization frames SF in one channel may be offset from the synchronization frames SF in the other channels by a predetermined or random number of frames.

Channel A and channel B may correspond to video having different content or may include the same video content but provided at a different variants of bit rate, frame rate and/or frame size. For example, channel A may be a low resolution video of a live broadcast that is provided to a user as a preview and channel B may be a high resolution video of the same live broadcast that is provided to the user in response to a request to watch the live broadcast. In another example, channel A may be a live broadcast of a show being captured with a first camera and channel B may be a live broadcast of a show being captured with a second camera.

The channel stream may represent the data transmitted over the network and received by the display device in response to the request to transition from channel A to channel B. The playback of channels A and B, is shown in FIG. 3.

In response to the request to transition from channel A to channel B, the client device may issue a request to receive the manifest file from the distribution server. The received manifest file may provide the client device a list of the available channels and chunks associated with those channels. Based on the information in the manifest file and the details of the request to transition, the client device may select the chunk of channel B that corresponds to the request to transition and request that the selected chunk be sent to the client device. The client device may buffer the selected chunk and select the destination frame in the received chunk that corresponds to the request to transition. The destination frame and the frames following the destination frame may be decoded and displayed on the client device. The destination frame may be decoded by only decoding the preceding frames that are needed to decode the destination frame. Thus only the reference frame preceding the destination frame may be decoded and all of the frames following the destination frames may be decoded.

Figure 4:
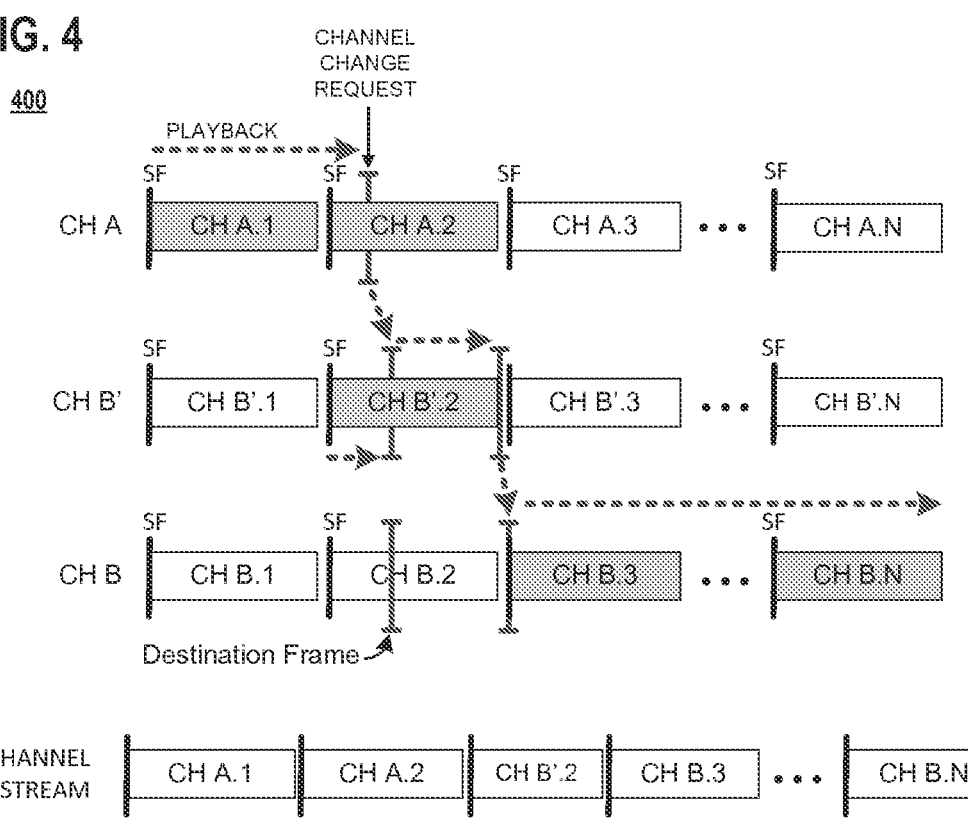
FIG. 4 illustrates a method to transition from a first channel to a second channel using an intermediate channel according to an embodiment of the present disclosure

FIG. 4 illustrates a method to transition from a first channel to a second channel using an intermediate channel according to an embodiment of the present invention. FIG. 4 illustrates transitioning from channel A, parsed into chunks CH A.1-A.N, to channel B, parsed into chunks CH B.1-B.N. The transitioning from channel A to channel B may include using an intermediate channel B', parsed into chunks CH B'.1-B'.N. The intermediate channel B' may be provided at a quality that is lower than the quality channel B. The lower quality allows for the content of intermediate channel B' to be buffered and decoded faster than the content of channel B.

Channel A may represent the channel currently being sent by a distribution server to the client device and channel B may represent the channel to which the distribution server and/or the client device will transition in response to a request. The first frame of each chunk may be coded as a synchronization frame SF that can be decoded without reference to any previously-coded frame of the video sequence.

Channel A and channel B may include video having different content or may include the same video content but provided at a different variants of bit rate, frame rate and/or frame size. Channel B' may include video content that corresponds to the video content of channel B but with a lower quality (e.g., lower bit rate, frame rate and/or frame size).

As shown in FIG. 4, the request to transition from channel A to channel B may be received when the synchronization frame SF of channel B does not align with the request to transition. To avoid waiting until the next synchronization frame SF of channel B to transition to channel B, the transition may be initiated immediately by transitioning first to an intermediate channel B' and then transitioning to channel B at the next synchronization frame SF of channel B.

The lower quality (e.g., lower bit rate, frame rate and/or frame size) of the intermediate channel B' allows the decoder to receive and decode the video content faster than the decoder would otherwise decode the higher quality data of channel B. Thus, using the intermediate channel allows for the decoding latency to be reduced and to provide a faster transition to the content of channel B. The decoder may decode the content of intermediate channel B' up until the next synchronization frame SF of channel B. At the synchronization frame SF of channel B, the decoder can immediately switch to channel B and decode the content of channel B without having to buffer any preceding frames of the higher quality data. While switching to the lower quality intermediate channel B' may provide lower quality video for a short period of time, the transition can be performed at the time of the request without significant delay.

While the synchronization frame SF of the intermediate channel B' is shown aligned with the synchronization frame SF of channel B, the synchronization frames may be offset from each other. In one embodiment, if the request is made at the time of the synchronization frame of channel B, the transition can be made directly to channel B without using the intermediate channel B'. One or more of the other transitioning embodiment discussed in this disclosure may be used to transition from channel A to channel B'.

The channel stream may represent the data transmitted over the network and received by the display device in response to the request to transition from channel A to channel B. As shown in FIG. 4, the channel stream can provide data to transition from content of channel A to content of channel B, via channel B', approximately at the time of the request. While the channel stream will include a chunk with content of channel B that is at a lower bit rate, frame rate and/or frame size, for a short period of time, the content of the channel stream can be switched at the time of the request without a significant delay. While the whole chunk of the respective channels may be sent to the client device, only a portion of the data in the chunk can be decoded to facilitate the transition. The playback of channels A and B, is shown in FIG. 4.

In response to the request to transition from channel A to channel B, the client device may issue a request to receive the manifest file from the distribution server. The received manifest file may provide the client device a list of the available channels and chunks associated with those channels. Based on the information in the manifest file and the details of the request to transition, the client device may decide whether the destination frame in channel B aligns with one of the synchronization frames in channel B. If the destination frame in channel B aligns with a synchronization frame in channel B, then the chunks starting with the chunk containing the aligned synchronization frame can be received and decoded by the client device.

If the destination frame in channel B does not align with a synchronization frame in channel B, the client device may determine whether the transition time may be reduced by using one or more of the intermediate channels. If the transition time cannot be reduced, then the client device may request chunks from only channel B to be sent to and decoded by the client device. However, if the transition time can be reduced, the client device may select a chunk of an intermediate channel that corresponds to the request to transition and request that the selected chunk be sent to the client device. The client device may buffer the selected chunk and select the frame in the chunk that corresponds to the destination frame. The selected chunk and following chunks in the intermediate channel may be decoded and displayed until a synchronization frame is encountered in channel B. Once the synchronization frame in channel B is encountered, the chunks of channel B may be received, decoded and displayed by the client device.

FIG. 5 illustrates a method to transition from a first channel to a second channel using an intermediate channel according to another embodiment of the present invention. FIG. 5 illustrates transitioning from channel A, parsed into chunks CH A.1-A.N, to channel B, parsed into chunks CH B.1-B.N. The transitioning from channel A to channel B may include using an intermediate channel B', parsed into chunks CH B'.1-B'.N. The intermediate channel B' may include chunks of data that are shorter than the chunks in channel B. For example, the chunks in channel B may be provided using a default chunk size (e.g., 10 seconds) and the chunks in the intermediate channel B' may be provided using a smaller chunk size than the default value (e.g., 3 seconds). The shorter chunks in the intermediate channel B' provide for a higher frequency of the synchronization frames to be provided in the intermediate channel B' as compared to the frequency of synchronization frames in channel B.

Channel A may represent the channel currently being sent by a distribution server to the client device and channel B may represent the channel to which the distribution server and/or the client device will transition in response to a request. The first frame of each chunk may be coded as a synchronization frame SF that can be decoded without reference to any previously-coded frame of the video sequence.

Channel A and channel B may include video having different content or may include the same video content but provided at a different variants of bit rate, frame rate and/or frame size. Channel B' may include video content that corresponds to the video content of channel B but encoded with chunks that are shorter in duration. In one embodiment, the quality of the video content in channels B and B' may be similar but because smaller chunks are used to encode channel B' the bit rate of channel B' may be higher than the bit rate of channel B. In one embodiment, the bit rate of channel B and channel B' may be similar but the quality may be lower in channel B' to compensate for the smaller chunks. The default chunk size may be set by the encoder depending on the video content, available network bandwidth, desired size of bit stream, parameters of the client device, or other encoder settings. The chunks of the intermediate channel may made smaller even though a higher number of bits will be used or the quality of the video will be reduced.

As shown in FIG. 5 the request to transition from channel A to channel B may be received when the synchronization frame SF of channel B does not align with the request to transition. To avoid waiting until the next synchronization frame SF of channel B to transition to channel B, the transition may be initiated immediately by transitioning first to an intermediate channel B' and then transitioning to channel B at the next synchronization frame SF of channel B.

The higher frequency of the synchronization frames SF in the intermediate channel B' provides for synchronization frames that are potentially closer to the request then the synchronization frames of channel B. Thus, when the request for the transition is made, transition from channel A to intermediate channel B' can be processed faster than the transition from channel A to channel B. After transitioning to intermediate channel B', the content of intermediate channel B' may be provided and decoded until the next synchronization frame SF of channel B is encountered, at which point the transition can be made from intermediate channel B' to channel B without significant delay.

Transitioning from channel A to intermediate channel B' may include waiting until the next synchronization frame SF is encountered. Because of the high frequency of the synchronization frames, the delay between the channel change request and the next synchronization frame in the intermediate channel B' is smaller as compared to the delay associated with switching to channel B. In an alternative embodiment, transitioning from channel A to intermediate channel B' may include finding the closest preceding synchronization frame SF in the intermediate channel B', and buffering and decoding intermediate channel B' up to the frame that is aligned with the request (e.g., according to the embodiment shown in FIG. 3).

In one embodiment, when the request to transition from channel A to channel B is received, a determination can be made as to which channel between intermediate channel B' and channel B includes the closest synchronization frame SF following request or preceding the request. If channel B has the closest synchronization frame SF or the synchronization frames SF of both channels are found in the same location, then the transition can be made directly to channel B without using intermediate channel B'. However, if the closest synchronization frame SF is found in the intermediate channel B' then the transition from channel A to channel B may include, first transitioning to the intermediate channel B' and then, transitioning to the channel B at the next synchronization frame SF of channel B. In one embodiment, a plurality of intermediate channels may be included with each providing chunks of different durations that are smaller than the default chunk duration.

The synchronization frames SF of channel B and channel B' do not have to be aligned. The synchronization frames of channel B and channel B' may be offset from each other by a predetermined length. In another embodiment, the length of channel B' may be set such that the synchronization frames SF of channel B and channel B' are offset from each other. Having the synchronization frames SF of channel B and channel B' not aligned increases the chances that a synchronization frame will be aligned with the request to transition to channel B.

The channel stream may represent the data transmitted over the network and received by the display device in response to the request to transition from channel A to channel B. As shown in FIG. 5, the channel stream can provide data transition from the content of channel A to content of channel B approximately at the time of the request. While the channel stream may include a chunk with content of channel B that is at a lower quality or which required more bandwidth for a short period of time, the content of the channel stream can be switched at the time of the request without a significant delay.

In response to the request to transition from channel A to channel B, the client device may issue a request to receive the manifest file from the distribution server. The received manifest file may provide the client device a list of the available channels and chunks associated with those channels. Based on the information in the manifest file and the details of the request to transition, the client device may decide whether the destination frame in channel B aligns with one of the synchronization frames in channel B. If the destination frame in channel B aligns with a synchronization frame in channel B, then the chunks starting with the chunk containing the aligned synchronization frame can be received and decoded by the client device.

If the destination frame in channel B does not align with a synchronization frame in channel B, the client device may determine whether the transition time may be reduced by using one or more of the intermediate channels having varying duration of chunks. If the transition time cannot be reduced, then the client device may request chunks from only channel B to be sent to and decoded by the client device. However, if the transition time can be reduced, the client device may select a chunk of an intermediate channel that corresponds to the request to transition and request that the selected chunk be sent to the client device. The client device may buffer the selected chunk and select the frame in the chunk that corresponds to the destination frame. The selected chunk and following chunks in the intermediate channel may be decoded and displayed until a synchronization frame is encountered in channel B. Once the synchronization frame in channel B is encountered, the chunks of channel B may be received, decoded and displayed by the client device.

FIG. 6 illustrates a method to transition from a first channel to a second channel using additional reference frames provided within chunks of the data stream according to an embodiment of the present invention. FIG. 6 illustrates transitioning from channel A, parsed into chunks CH A.1-A.N, to channel B, parsed into chunks CH B.1-B.N. The transitioning from channel A to channel B may include using a number of reference frames RF associated with the chunk of channel B. The reference frames RF provide additional reference frames within the chunk that can be quickly decoded to allow for quick decoding of channel B data following the request. The additional reference frames may be frames that are not provided within the chunk using default settings of the encoder. As shown in FIG. 6, the reference frames RF may be provided as part of chunk to which the transition is made. In another embodiment, the reference frames RF', which correspond to the reference frames RF in chunk of channel B, may be provided as a side channel.

Channel A may represent the channel currently being sent by a distribution server to the client device and channel B may represent the channel to which the distribution server and/or the client device will transition in response to a request. The first frame of each chunk may be coded as a synchronization frame SF that can be decoded without reference to any previously-coded frame of the video sequence. At the time of the request, a destination channel may be determined in channel B that corresponds to the request to transition.

One or more chunks of channel B provided by the distribution server may include additional reference frames (e.g., P-frames) distributed within the chunk. The additional reference frames may be part of channel B or may be provided in a separate channel. While with default settings the encoder may limit the number of reference frames that are provided within a particular chunk to limit the size of the chunk, the additional reference frames may be included in a chunk to improve the transition to channel B. The reference frames may be frames that are provided in addition to the synchronization frame (e.g., I-frame) of the respective chunk. The reference frames may use data from one or more previous frames to be decoded. In one embodiment, the reference frames may need only the data of the synchronization frame to be decoded. Thus, any one of the reference frame can be quickly decoded without needing every preceding frame or more than one preceding frame. The additional reference frames also do not need any frames following the reference frame to be decoded.

As shown in FIG. 6 the request to transition from channel A to channel B may be received when the synchronization frame SF of channel B does not align with the request to transition. To avoid waiting until the next synchronization frame SF of channel B to transition to channel B, the transition may be initiated immediately by utilizing the available additional reference frames within the chunk that correspond to the request. In response to the request to transition, a chunk with the additional reference frames or a side channel with the additional reference frames may be sent to the client device. Using the additional reference frames, the closest additional reference frame to the request within the chunk can be determined. The closest reference frame may be the closest reference frame preceding the request or the closest reference frame following the request.

The selected reference frame (e.g., reference frame FR5 in FIG. 6) may be decoded and used as the starting frame to provide the content of channel B. Alternatively, the selected reference frame may be used as a reference to decode another nearby frame that corresponds to the destination frame. Because the selected reference frame does not need every single preceding frame or any frames following the selected reference frame to be decoded, the selected reference frame can be decoded by only using the frames needed for the decoding. For example, if the selected reference frame only needs the synchronization frame SF of the chunk to be decoded, only the synchronization frame SF and the selected reference frame need to be buffered and decoded to start providing the content of channel B. All of the frames following the selected reference frames can be decoded using the information in the selected reference frame.

The use of additional reference frames provides more transitioning locations to be provided within the chunk without using the more costly synchronization frames SF (e.g., I-Frames). The additional reference frames may be provided at a predetermined interval (e.g., every half a second) within the chunk. The bitstream may be indexed in a manifest file, so that all the bits of the chunk do not have to be buffered to decode the reference frame corresponding to the request to transition. For example, pointers to the reference frames may be provided in the manifest file, so that the decoder can locate the reference frame that is closest to the request.

The reference frames may be provided in one or more channels by the distribution server. The additional reference frames may be provided in the channels that are provided as a preview to the user. In another embodiment, the additional reference frames may be provided in response to a request and/or only in the chunks that correspond to the request.

The channel stream may represent the data transmitted over the network and received by the display device in response to the request to transition from channel A to channel B. As shown, because chunk CH B.1 corresponds to the request to transition, additional channels may be provided with chunk CH B.1.

In response to the request to transition from channel A to channel B, the client device may issue a request to receive the manifest file from the distribution server. The received manifest file may provide the client device the available channels and chunks associated with those channels. Based on the information in the manifest file and the details of the request to transition, the client device may decide whether the destination frame in channel B aligns with one of the synchronization frames in channel B. If the destination frame in channel B aligns with a synchronization frame in channel B, then the chunks starting with the chunk containing the aligned synchronization frame can be received and decoded by the client device.

If the destination frame in channel B does not align with a synchronization frame in channel B, the client device may determine whether the transition time may be reduced by using additional reference frames associated with the chunk corresponding to the request to transition. If the transition time cannot be reduced, then the client device may request chunks from channel B to be sent to and decoded by the client device. However, if the transition time can be reduced, the client device may request that one or more additional reference frames are provided as part of the chunk corresponding to the request to transition or as part of a side channel. The client device may request that only the synchronization frame and the reference frame corresponding to the destination frame be sent to the client device, based on the information in the manifest file.

The client device may buffer and decode the synchronization frame and the reference frames. The decoded reference frame may be used to provide the destination frame and continue the decoding of frames following the destination frame. The decoded frames may be displayed by the client device.

Figure 7:
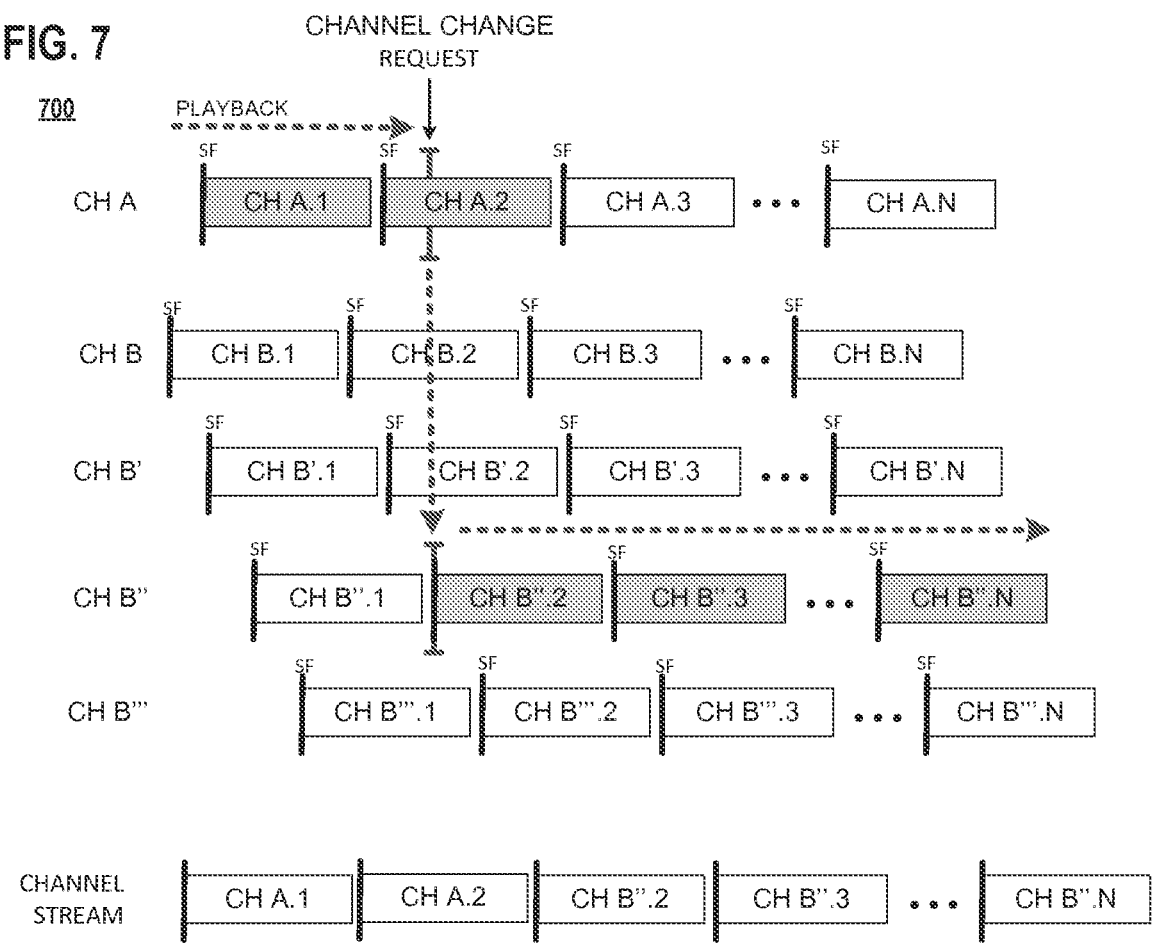
FIG. 7 illustrates a method to transition from a first channel to a second channel, which is one of a plurality of offset channels according to an embodiment of the present disclosure.

FIG. 7 illustrates a method to transition from a first channel to a second channel, which is one of a plurality of offset channels, according to an embodiment of the present invention. FIG. 7 illustrates transitioning from channel A, parsed into chunks CH A.1-A.N, to one of a plurality of offset channels B, B', B" and B'". Each of the offset channels may be parsed into chunks CH B.1-B.N. The transitioning from channel A to one of the offset channels may include determining which of the offset channels includes a synchronization frame that is most closely aligned with the request and transitioning from channel A to the channel with the closest synchronization frame.

Channel A may represent the channel currently being sent by a distribution server to the client device and channel B may represent the channel to which the distribution server and/or the client device will transition in response to a request to transition. Additional channels B', B" and B'" with the same content as channel B may be provided but with the chunks and/or the synchronization frames that are offset. The distribution server may encode the channels to provide the channels with offset synchronization frames. The first frame of each chunk may be coded as a synchronization frame SF that can be decoded without reference to any previously-coded frame of the video sequence. While the synchronization frames SF in channel B and additional channels B', B" and B'" may be offset, the content at a given time that is available in each of the channels may be the same.

Channel A and channel B may include video having different content or may include the same video content but provided at a different variants of bit rate, frame rate and/or frame size. As shown in FIG. 7, the request to transition from channel A to channel B is received when the synchronization frame SF of channel B does not align with the request to transition. To avoid waiting until the next synchronization frame SF of channel B to transition to channel B, the transition may be initiated immediately by transitioning to one of the offset channels B', B", or B'" that has a closer synchronization frame SF to the request.

When the request to transition is received at the client device, the device may determine the channel from the available offset channels that includes the closest synchronization frame SF. The closest synchronization frame may be the closest synchronization frame before the request or the closest synchronization frame SF after the request. The client device may process the transition from channel A to the content of channel B by using the closest synchronization frame SF as the first frame of channel B content. Because the synchronization frame SF does not need any other frames to be buffered and decoded, the content of channel B can be displayed on the client device as soon as the synchronization frame SF is decoded.

The distribution server can provide all of the offset channels to the client device. In one embodiment, channel B and the additional channels B', B" and B'" are all provided with a same quality. In another embodiment, the offset channels B', B" and B'" may be channels having a lower quality than the quality of channel B. Once the synchronization frame of the channel B having a higher quality is encountered a transition could be made to channel B from the offset channels B', B" and B'".

In another embodiment, in response to a request form the client device, the distribution server may provide only the offset channel that includes the closest synchronization frame SF to the client device. The information about the offset channels and the location of the synchronization frames may be provided to the client device via a manifest file. Thus, using the information in the manifest file, the client device may determine which channel should be sent to the client device and include the requested channel in the request to the distribution server.

In one embodiment, the offset channels may be mixed with channels that have chunks of different lengths to provide a better distribution of available synchronization frames. While the synchronization frames are shown at the beginning of the chunks in FIG. 7, the synchronization frames may be located at other locations within the chunks.

The channel stream may represent the data transmitted over the network and received by the display device in response to the request to transition from channel A to channel B.

In response to the request to transition from channel A to channel B, the client device may issue a request to receive the manifest file from the distribution server. The received manifest file may provide the client device a list of the available channels and chunks associated with those channels. The manifest file may include information about a plurality of channels that include content of channel B and have synchronization frames that are offset from each other. Based on the information in the manifest file and the details of the request to transition, the client device may determine which chunk from the available channels can be received and decoded faster. The client device may select the channel that includes the closest synchronization frame to the request to transition. The client device may send a request to the distribution server to send the selected channel and chunk from the channel corresponding to the request. The received chunk may be decoded and displayed by the client device.

Figure 8:
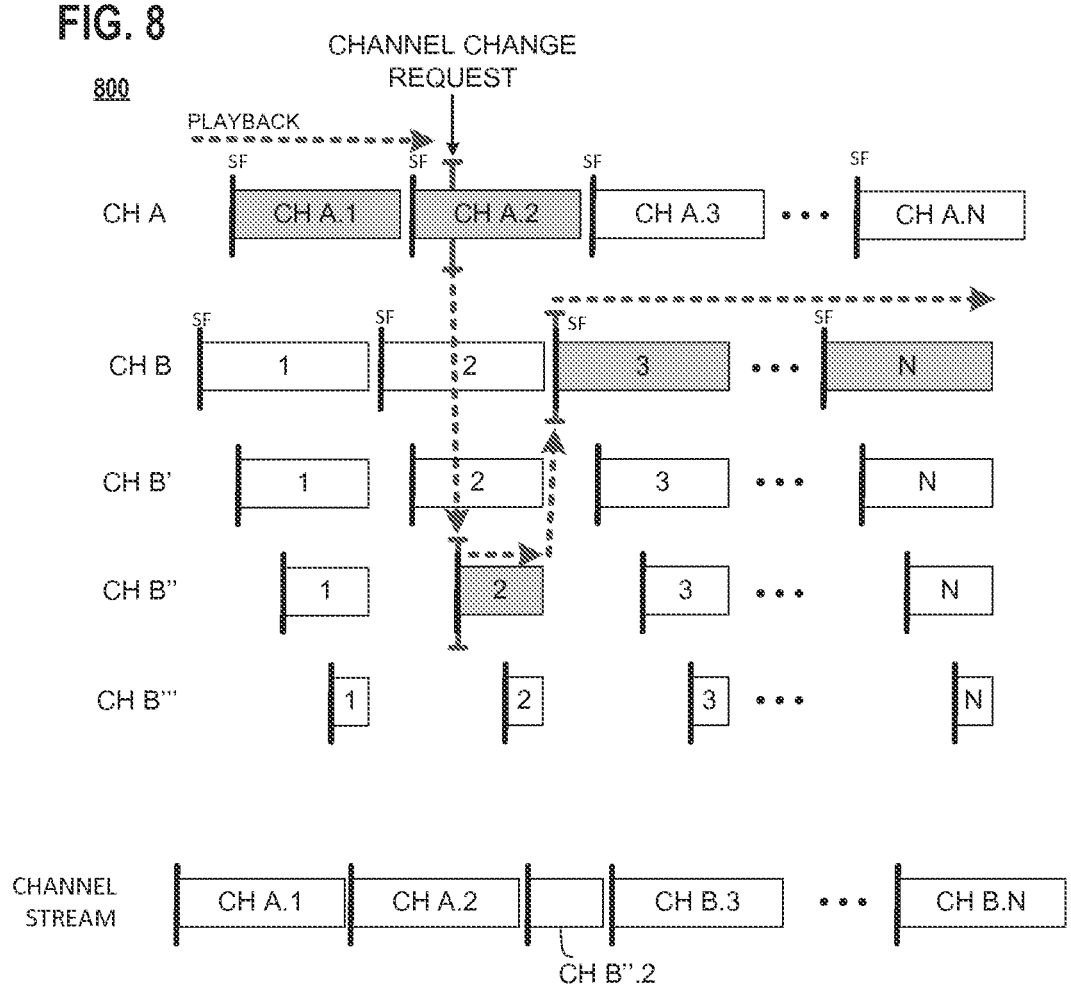
FIG. 8 illustrates a method to transition from a first channel to a second channel via a staggered channel according to an embodiment of the present disclosure.

FIG. 8 illustrates a method to transition from a first channel to a second channel via a staggered channel according to another embodiment of the present invention. FIG. 8 illustrates transitioning from channel A, parsed into chunks CH A.1-A.N, to channel B, parsed into chunks CH B.1-B.N, via one of staggered channels B', B" and B'". Transitioning from channel A to channel B may include first transitioning to one of the staggered channels B', B" and B'" and to channel B when the synchronization frame SF is encountered in channel B.

Channel A may represent the channel currently being sent by a distribution server to the client device and channel B may represent the channel to which the distribution server and/or the client device will transition in response to a request. The first frame of each chunk may be coded as a synchronization frame SF that can be decoded without reference to any previously-coded frame of the video sequence. The content at a given time that is available in each of the channels B, B', B" and B'" may be the same.

While additional channels B', B" and B'" are provided with the same content as channel B at a given time, they may include only partial portions of the content provided in the respective chunk of channel B. Each additional channel B', B" and B'" may have a predetermined portion of the corresponding chunk not included in the channel. For example, the first portion of each chunk in the additional channels B', B" and B'" may have a different predetermined portion (e.g., based on number of frames or a predetermined duration) not provided in the chunks. In the embodiment with the synchronization frames SF provided at the beginning of each chunk, the synchronization frames SF will be offset from each other due to the different starting points and lengths of the chunks.

Channel A and channel B may include video having different content or may include the same video content but provided at a different variants of bit rate, frame rate and/or frame size. As shown in FIG. 8, the request to transition from channel A to channel B is received when the synchronization frame SF of channel B does not align with the request to transition. To avoid waiting until the next synchronization frame SF of channel B to transition to channel B, the transition may be initiated immediately by transitioning to one of the staggered channels B', B", or B'" that has a closer synchronization frame SF to the request.

When the request to transition is received at the client device, the client device may determine the intermediate channel (e.g., channel B") from the staggered channels that includes the closest synchronization frame SF. The closest synchronization frame SF may be the closest synchronization frame SF before the request or the closest synchronization frame SF after the request. The client device may process the transition from channel A to the content of channel B by using the closest synchronization frame SF of the intermediate channel (e.g., channel B") as the first frame of channel B content. Because the synchronization frame SF does not need any other frames to be buffered and decoded, the content of channel B can be displayed on the client device as soon as the synchronization frame SF of the intermediate channel is decoded. Once the synchronization frame SF of channel B is encountered (e.g., at the end of the chunk in channel B") the transition can be made to the synchronization frame SF of channel B from the intermediate channel. As shown in FIG. 8, the end of each chunk in the additional channels may be aligned with the synchronization frames of channel B.

The distribution server can provide all of the staggered channels to the client device. The staggered channels B', B" and B'" may be channels having a lower quality than channel B. The content of channels B', B" or B'" may be provided in lower quality than channel B until the synchronization SF of channel B is encountered. Once the synchronization frame of the channel B is encountered, a transition could be made to channel B.

In another embodiment, in response to a request form the client device, the distribution server may provide only the staggered channel that includes the closest synchronization frame SF to the client device. The information about the staggered channels and the location of the synchronization frames may be provided to the client device via a manifest file. Thus, using the information in the manifest file, the client device may determine which channel should be sent to the client device and include the requested channel in the request to the distribution server.

The channel stream may represent the data transmitted over the network and received by the display device in response to the request to transition from channel A to channel B.

In response to the request to transition from channel A to channel B, the client device may issue a request to receive the manifest file from the distribution server. The received manifest file may provide the client device a list of the available channels and chunks associated with those channels. The manifest file may include a list of intermediate channels that include chunks with only portions of the frames of corresponding chunks of channel B. Based on the information in the manifest file and the details of the request to transition, the client device may decide whether the destination frame in channel B aligns with one of the synchronization frames in channel B. If the destination frame in channel B aligns with a synchronization frame in channel B, then the chunks starting with the chunk containing the aligned synchronization frame can be received and decoded by the client device.

If the destination frame in channel B does not align with a synchronization frame in channel B, the client device may determine whether the transition time may be reduced by using one or more of the intermediate channels having varying portions of the corresponding chunks of channel B. If the transition time cannot be reduced, then the client device may request chunks from only channel B to be sent to and decoded by the client device. However, if the transition time can be reduced, the client device may select the channel from the intermediate channels which includes a synchronization frame that is closest to the request to transition. A chunk from the selected channel that includes the closest synchronization frame may be selected and requested to be sent to the client device.

The client device may buffer and decode the selected chunk. The selected chunk and following chunks in the intermediate channel may be decoded and displayed until a synchronization frame is encountered in channel B. Once the synchronization frame in channel B is encountered, the chunks of channel B may be received, decoded and displayed by the client device.

Figure 9:
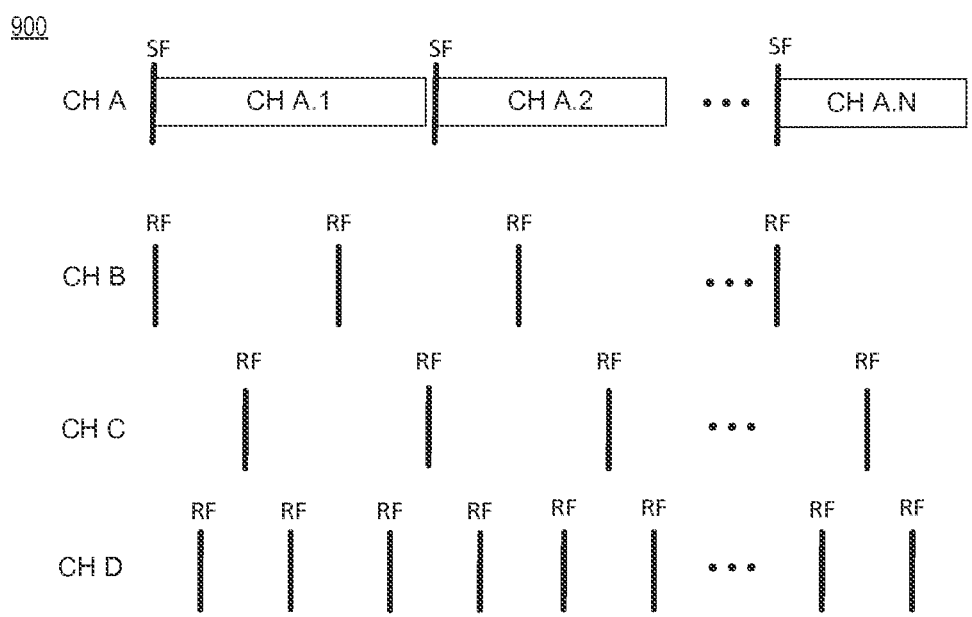
FIG. 9 illustrates a playback method using multiple scalable channels according to an embodiment of the present disclosure.

FIG. 9 illustrates a playback method using multiple scalable channels according to an embodiment of the present invention. FIG. 9 illustrates channel A, parsed into chunks CH A.1-A.N, and a plurality of channels B-D providing reference frames RF at a plurality of rates and/or at different instances of time. Channels B-D include reference frames (e.g., synchronization frames or I-Frames) which may be used to support fast forward (ffwd) and/or rewind (rwd) functions on a player of the content in channel A. Multiple channels B-D may be combined to provide different speeds of the ffwd and/or rwd functions. The ffwd and rwd functions using the I-Frames may be implanted by the HTTP Live Streaming (HLS) protocol, but is not so limited.

Channels B-D may provide reference frames at different rates. For example, channels B and C may include reference frames at one-eighth frames per second (i.e., one frame every eight seconds). Channel D may include reference frames at one-half frames per second (i.e., one frame every two seconds). The channels B-D may also include reference frames which are offset from each other. For example, as shown in FIG. 9, while channel B and C have reference frames provided at the same rate, the channels may be offset from each other. All of the channels B-D may have reference frames that are offset from the reference frames in the other channels.

Controlling the reference frames which are provided from the one or more of the channels B-D may provide the needed reference frames for a specific ffwd and/or rwd function. For example, the reference frames from all of the channels B-D may be used for slow ffwd and/or rwd operations (e.g., 2×). Because the reference frames in all of the channels B-D are offset from each other, the different channels may be combined into a single stream having a high frequency of reference frames. For faster ffwd and/or rwd operations a fewer number of reference frames may be used. To increase the speed of the ffwd and/or rwd operations, the reference frames from one or more of the channels may be removed. For example, only channels B and C may be used to provide ffwd and/or rwd operation with a faster speed (e.g., 4×). Similarly, only one of channel B and C may be used to provide ffwd and/or rwd operation for the fastest speed (e.g., 8×).

The distribution server may provide the one or more of the channels B-D based on a command received from the client device or the mobile device. The distribution server or the client device may make a decision as to which channels should be pulled without pulling channels that are not needed for the particular operation. The distribution server or the client device may select the number of reference frames needed for the particular ffwd and/or rwd operation and determine the channels that should be sent to the client device or the mobile device to perform the requested operation. Once the ffwd and/or rwd operation is finished, one or more of the above discussed transitioning methods may be used to transition back to the channel (e.g., channel A) providing the original content. The information about the available channels may be provided to the client device in a manifest file. The client device may request the channels needed for the particular operation based on the information provided in the manifest file.

The above discussed transitioning methods may also be applied to transitioning between channels that provide video content with different aspect ratios. Traditionally, when video content is received with an aspect ratio that is different from the aspect ratio of the display, the video content is either displayed with black areas on some edges of the video content or the video content is zoomed and cropped at the edges. The cropping is generally performed after the video content is received and decoded. With such approaches the cropped video content waists bits that are not displayed on the display device.

Multiple channels may be used to provide the same video content with different aspect ratios. For example, the video content of the first channel may provide video using a first aspect ratio (e.g., 16:9) and the second channel may provide the same video content with a second aspect ratio (e.g., 4:3). While the first aspect ratio may correspond to the aspect ratio of the original video source, the second aspect ratio may correspond to a zoomed and cropped video of the original video source.

Because the second channel does not include the cropped area, lower number of bits may be used to encode the center of the video content in the second channel. Alternatively, the same number of bits may be used to encode the second channel as the first channel but with a higher quality as compared to the quality of the first channel.

In another embodiment, a first channel may provide the center content of the video and additional channels may provide the side content of the video content for various aspect ratios. One or more of the additional channels may be added to the center of the video content to provide different aspect ratios. The center content may correspond to the 4:3 aspect ratio and the additional channels may provide side content go generate additional aspect ratios. For example, the first channel may provide the center content, the second channel may provide the side content for 16:9 aspect ratio and the third channel may provide the side content for a 2.4:1 aspect ratio. When the 16:9 aspect ratio is requested, both the first channel with the center content and the second channel may be combined to provide the video content with the 16:9 aspect ratio. When the 2.4:1 aspect ratio is requested, both the first channel with the center content and the third channel may be combined to provide the video content with the 2.4:1 aspect ratio. When only the center content can be displayed on the device (e.g., for 4:3 aspect ratio), only the first channel can be sent to the display device. In one embodiment, the center content and the channels with the side content may overlap to provide better prediction and for blending.

The distribution server or the client device may perform the processing of the original video content to provide the multiple channels that may be used to display the different aspect ratios at the display device. For example, the distribution server or the client device may perform the cropping and encoding of the second channel. The channels that are used for the different aspect ratios may be provided to the display device (e.g., client device or mobile device) in response to a request by the user or automatic operation of the device. When such a request is made, one or more of the above discussed method may be used to transition from the first channel to another channel. In response to the request, the distribution server or the client device may send multiple channels to the display device to provide the requested aspect ratio. The request may be issued by the user, for example, when the user maximizes or minimizes the display of the video. The request may be automatically made by the device, for example, when the user rotates the device and the video is flipped between being displayed horizontally and vertically.

The information about the available channels for the various aspect ratios may be provided to the client device via a manifest file. The client device may request the channels needed for the particular aspect ratio based on the information provided in the manifest file.

Figure 10:
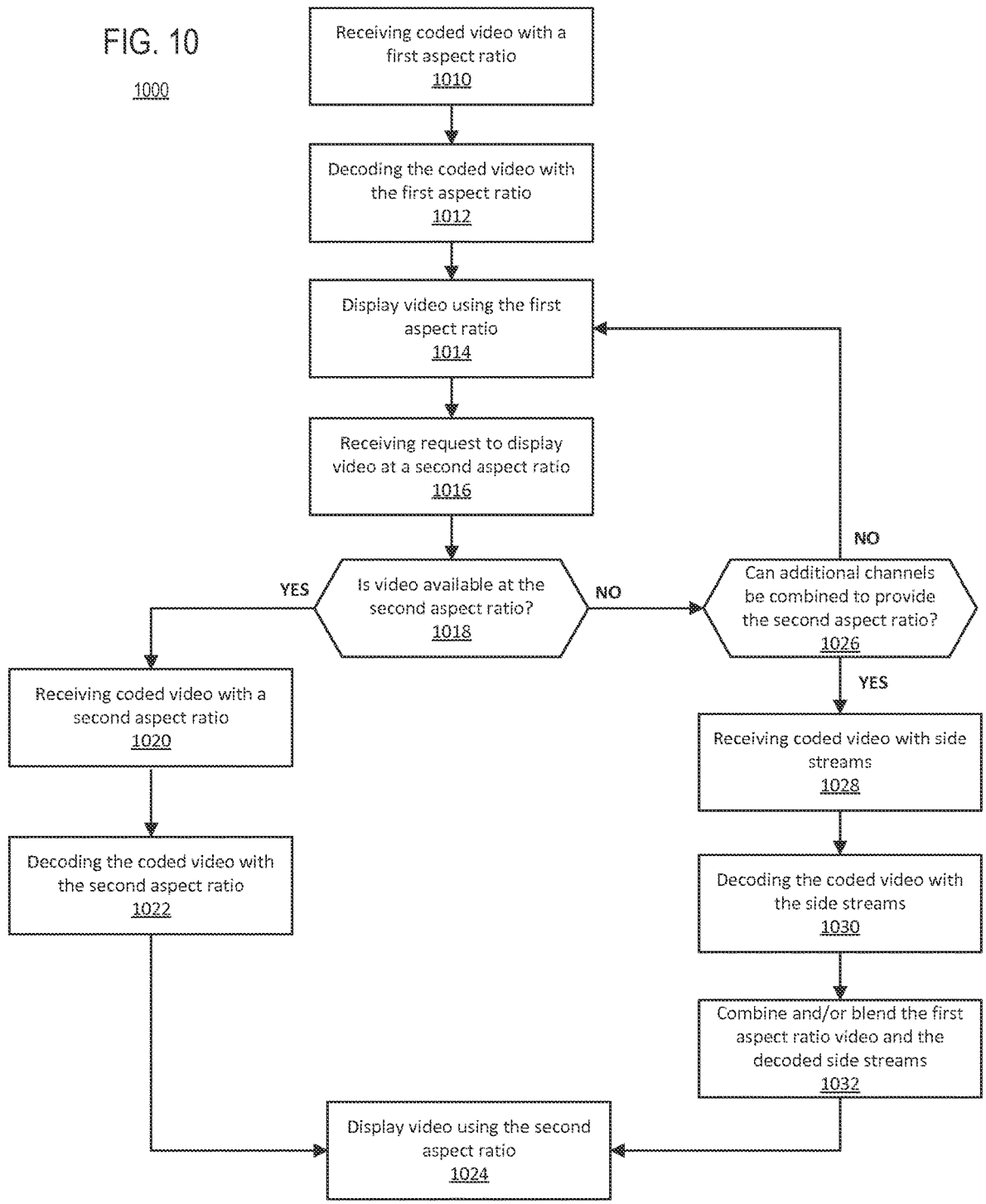
FIG. 10 illustrates a method 1000 to provide different aspect ratios of video content according to an embodiment of the present disclosure.

FIG. 10 illustrates a method 1000 to provide different aspect ratios of video content according to an embodiment of the present disclosure. The method 1000 may include receiving video content with a first aspect ratio and, in response to a request to provide video with a second aspect ratio, providing video content with the second aspect ratio. The video content with the second aspect ratio may be provided by using existing video content with the second aspect ratio or by obtaining side streams that can be combined with the already received video content to provide the second aspect ratio.

The method 1000 may include receiving coded video with a first aspect ratio (box 1010). The coded video with a first aspect ratio may be decoded (box 1012) and displayed (box 1014) on a display device. In response to a request to receive the same video content with a second aspect ratio (box 1016), a determination may be made whether a coded video data is available with the second aspect ratio (box 1018). If the coded video data is available with the second aspect ratio, then the video with the second aspect ratio can be received (box 1020) and decoded (box 1022). The decoded video stream can be displayed on a display device using the second aspect ratio (box 1024).

If the coded video data with second aspect ratio is not available, then a determination can be made as to whether additional channels can be received and combined to provide the second aspect ratio (box 1026). If the second aspect ratio cannot be obtained with the additional channels, then the first aspect ratio can still be displayed on the display device (box 1014).

However, if the content in the additional channels can be combined with the video content having the first aspect ratio, then the channels with the additional content (e.g., side streams) can be received (box 1028) and decoded (box 1030). The decoded content can be combined with the content of the video having the first aspect ratio (box 1032). If there is overlap between the video content then blending may also be performed on the video content (box 1032). The combined video content may be displayed with the second aspect ratio on a display device (box 1024). One or more of the above discussed transitioning methods may be used to transition from the video with the first aspect ratio to the video with the second aspect ratio.

In another embodiment, the above discussed methods to transition from a first channel to a second channel may include slowing down the playback of the first and/or second channel to provide more time for the content of the second channel to be prepared for playback. Slowing down the playback of the second channel can help to provide a smooth transition to the second channel. The playback of the second channel may be slowed down such that it is not noticeable to the user. The playback of the second channel may be slowed down at the time of the request. In another embodiment, the playback of the first or second channel, or any intermediate channel, may be slowed down when it is determined that more time is needed to buffer and decode the data of the second channel. The determination may be made by comparing the expected or calculated transition time to a predetermined time. If the expected transition time exceeds the predetermined time, the playback speed of the one or more channels may be adjusted. In another embodiment both the playback of the first channel and the playback of the second channel may be slowed down to provide more time to buffer and decode the content of the second channel. These methods may be applied to any of the above discussed methods of transitioning from a first channel to a second channel.

In another embodiment, the above discussed methods to transition from a first channel to a second channel may include adjusting the duration of the transition (e.g., animated transition) to control the speed with which the transition is made from a first channel to a second channel. The transition may include an animated transition that includes, for example, one or more effect. The effects may include providing blinds, blur, checker, cross fade, curtain, slide, push, wipe, zoom in, and zoom out. The animated transition may include an animation effect during the transition between a smaller resolution stream and a larger resolution stream. The transition may be slowed down to provide more time for the content of the second channel to be prepared for playback. Slowing down the transition of the second channel can help to provide a smooth transition to the second channel. The transition to the second channel may be slowed down such that it is not noticeable to the user. The transition may be slowed down when it is determined that more time is needed to buffer and decode the data of the second channel. The determination may be made by comparing the expected or calculated transition time to a predetermined time. If the expected transition time exceeds the predetermined time, the duration of the animated transition may be adjusted. These methods may be applied to any of the above discussed methods of transitioning from a first channel to a second channel.

One or more of the above discussed transition methods may be combined to transition from one channel to another channel.

Figure 11:
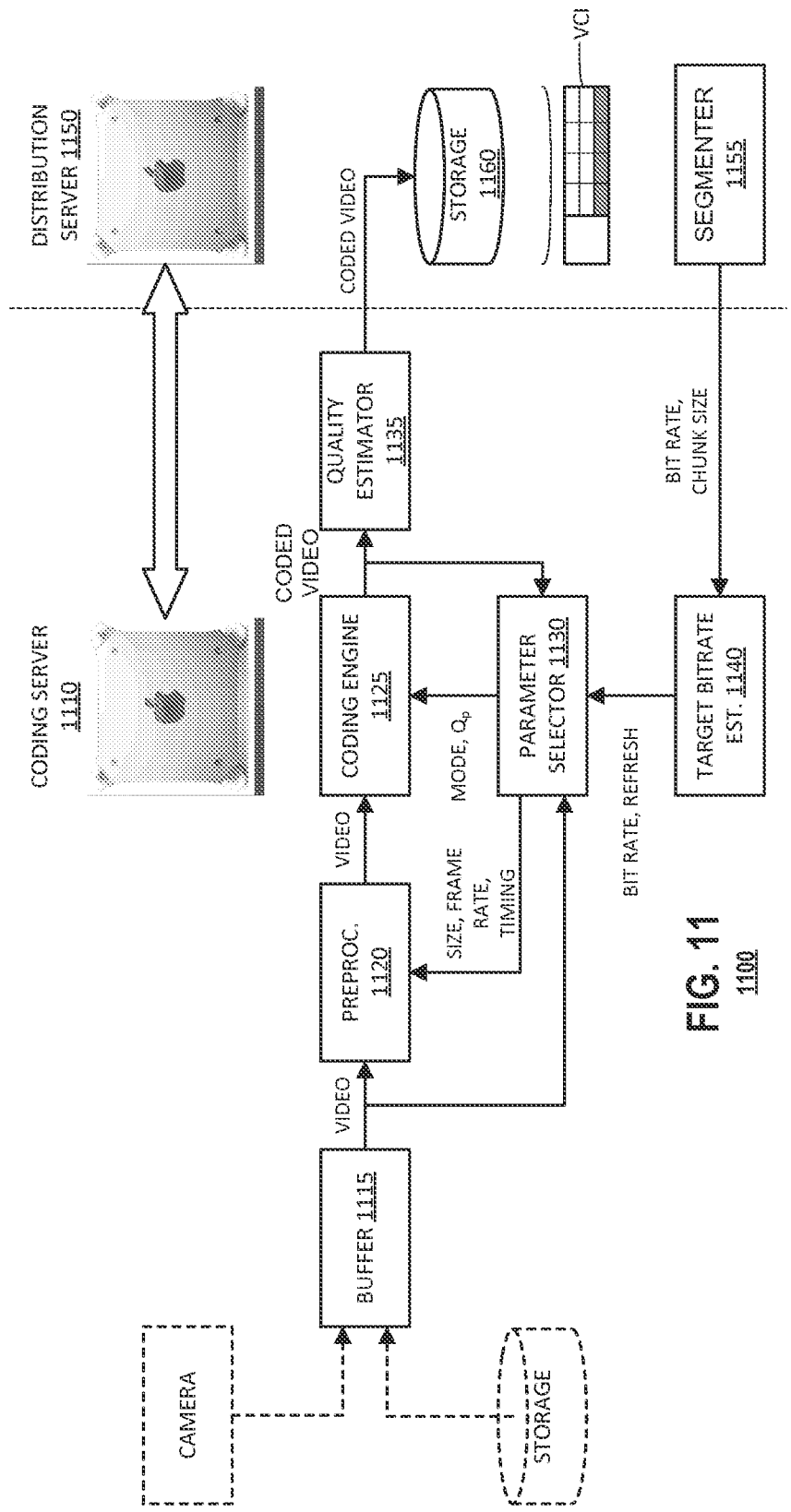
FIG. 11 is a simplified block diagram of a system having an integrated coding server and distribution server for use with the present disclosure.

FIG. 11 is a simplified block diagram of a system 1100 having an integrated coding server 1110 and distribution server 1150 for use with the present invention. The coding server 1110 may include buffer storage 1115, a preprocessor 1120, a coding engine 1125, a parameter selector 1130, a quality estimator 1135 and a target bit-rate estimator 1140. The distribution server 1150 may include a segmenter 1155 and storage 1160.

The coding server 1110 may receive one or more videos and provide different versions of coded video to the distribution server 1150 of each received video. The distribution server 1150 may use the different versions of the coded video to improve the transition from one video channel to another video channel. The various versions of the coded video may include different size, frame rate, timing, chunk size and/or key frame location of a common video sequence. The various versions may include video content with different aspect ratios or different portions of video content provided in separate channels.

The buffer 1115 may store input video, typically from a camera or a storage device, for processing by other components of the coding server 1110. For example, the preprocessor 1120 may alter a size and/or a frame rate of the video sequence. The preprocessor 1120 may apply size, frame rate and/or timing modifications to video that is read from the buffer 1115. The preprocessor 1120 may perform different size, frame rate and/or timing modifications on a common video sequence as the coding server 1110 generates its various coded versions of the sequence.

The coding engine 1125 may apply data compression operations to the video sequence from the preprocessor 1120. The coding engine 1125 may operate according to any of the common video coding protocols including the MPEG, H.263, H.264 and HEVC (H.265) families of coding standards. The coding engine 1125 may apply coding parameters to different elements of the video sequence, including, for example, a coding mode selection and quantizer parameter selection. The coding mode selection may select a coding mode to be applied to a frame being coded, for example, whether to code an input frame as an I-frame, P-frame or B-frame. The quantizer parameter selection may select a quantization parameter to apply to transform coefficients (or other data) to truncate these data elements prior to entropy coding and transmission.

A parameter selector 1130 may generate parameter data to the preprocessor 1120 and/or coding engine 1125 to govern their operation. The parameter selector 1130, for example, may cause the preprocessor 1120 to alter the size, frame rate and/or timing of data output to the coding engine 1125. The parameter selector 1130 may impose coding modes and/or quantization parameters to the coding engine 1125. The parameter selector 1130 may select the coding parameters based on bit rate estimates received from the target bit-rate estimator 1140 and/or based on complexity estimates of the source video.

A quality estimator 1135 may estimate quality of coded video data output by the coding engine. The quality estimator 1135 may output digital data representing a quantitative estimate of the quality of the coded video data.

A target bit-rate estimator 1140 may generate bit-rate estimates for segments of video based on the data rates to be supported by the distribution server 1150.

During operation, the target bit-rate estimator 1140 may apportion a bit rate to the video sequence and determine a refresh rate based on data rate and chunk size estimates provided by the distribution server 1150. In response to the bit rate selected by the target bit-rate estimator 1140 and based on analysis of the video sequence itself, the parameter selector 1130 may select operational parameters for the preprocessor 1120 and/or coding engine 1125. For example, the parameter selector 1130 may cause the preprocessor 1120 to adjust the frame size (or resolution) of the video sequence. The parameter selector 1130 also may select coding modes and quantization parameters to frames within the video sequence. The coding engine 1125 may process the input video by motion compensation predictive techniques and output coded video data representing the input video sequence.

The quality estimator 1135 may evaluate the coded video data and estimate the quality of the video sequence coded according to the selected parameters. The quality estimator 1135 may determine whether the quality of the coding meets predetermined qualitative thresholds associated with the bit rate set by the distribution server 1150. If the quality estimator 1135 determines that the coding meets the thresholds, the quality estimator 1135 may validate the coding. By contrast, if the quality estimator 1135 determines that the coding does not meet sufficient quality thresholds associated with the target bit rate, the quality estimator 1135 may revise the coding parameters applied by the parameter selector 1130 and may cause the preprocessor 1120 and coding engine 1125 to repeat operation on the source video.

Once the parameter selector 1130 selects a set of processing and coding parameters that satisfy quality metrics established by the quality estimator 1135, the coding server 1110 may advance to the next bit rate supported by the distribution server 1150. Again, the parameter selector 1130 and quality estimator 1135 may operate recursively, selecting parameters, applying them in preprocessing operations and coding, estimating quality of the coded video data obtained thereby and revising parameters until the quality requirements are met.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the disclosed embodiments. Other applications of the present invention may be embodied as a hybrid system of dedicated hardware and software components.

The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture, processing and distribution field having the benefit of this disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A video streaming method, comprising:
  receiving transmission units from a first sequence of coded video data;
  decoding the transmission units from the first sequence;
  in response to a request to transition to a second sequence of coded video data, determining whether a destination frame of the request to transition aligns with a synchronization frame of the second sequence of coded video data, wherein a synchronization frame is frame encoded without reference to any previously coded frame of the second sequence,
  when the destination frame does not align with a synchronization frame:
    selecting, from a plurality of eligible third sequences each third sequence including synchronization frames at staggered coding positions with respect to synchronization frames of the other third sequences, a third sequence having a synchronization frame prior to and closest in coding position to the destination frame,
    decoding, from the selected third sequence, additional reference frame(s) of the second sequence including at least one synchronization frame that provide prediction reference(s) for the destination frame in the second sequence,
    afterward, decoding the second sequence of the coded video data starting at the destination frame, including decoding the destination frame using a prediction reference developed from the decoded additional reference frame(s).

2. The method of claim 1, wherein the reference frames are contained in a same transmission unit in which the destination frame is contained.

3. The method of claim 1, wherein:
  the destination frame is contained in an intermediate transmission unit, different from transmission units of the second sequence, and
  the decoding of the second sequence begins following completion of decoding of the intermediate transmission unit.

4. The method of claim 1, wherein the destination frame is contained in a plurality of intermediate transmission units, each different from transmission units of the second sequence and having different starting points, the method further comprising:
  selecting one of the intermediate transmission units that a starting point that precedes the destination frame and whose starting point is closest to the destination frame, and
  decoding the selected intermediate transmission unit.

5. The method of claim 4, wherein the transmission units having different starting points have common durations.

6. The method of claim 4, wherein the transmission units having different starting points have common end points.

7. The method of claim 1, wherein at least one of the reference frames is contained in a transmission unit that is different from a transmission unit in which the destination frame is contained.

8. The method of claim 7, further comprising, responsive to a request to fast forward or rewind content of a currently-displayed sequence:
  selecting at least one of a plurality of channels including reference frames, each of the channels including reference frames that are staggered from the reference frames in the other channels and at least one of the channels includes the reference frames at a frequency that is higher than a frequency of the reference frames in the other channels, and
  displaying the reference frames from the selected channel.

9. The method of claim 1, wherein content of the first sequence of coded video data and the second sequence of coded video data are live broadcast.

10. The method of claim 1, wherein timing of the additional reference frames in the transmission unit is provided in manifest information describing the second video sequence of coded video data.

11. The method of claim 1, wherein:
  a quality of the first sequence of coded video data is lower than a quality of the second sequence of coded video data; and
  the first sequence of coded video data and the second sequence of coded video data include the same content.

12. The method of claim 1, wherein the request to transition is received at a device that simultaneously displays the first sequence and the second sequence, and switches modes of presentation of the first sequence and the second sequence in response to the request to transition.

13. The method of claim 1, wherein the request to transition is received at a device that replaces display of the first sequence with display of the second sequence in response to the request to transition.

14. The method of claim 1, wherein the additional reference frames may be decoded with reference only to a preceding synchronization frame of the second sequence.

15. The method of claim 1, wherein the additional reference frames are received in a third sequence, wherein the third sequence is a preview sequence.

16. The method of claim 1, wherein:
the decoding of the second sequence includes predicting the destination frame from additional reference frame (s).

17. The method of claim 1, further comprising:
receiving a chunk of data of the encoded second sequence including the additional reference frame(s).

18. Non-transitory computer readable storage medium having program instructions stored thereon that, when executed by a processing device, causes the device to:
receive transmission units from a first sequence of coded video data; decode the transmission units from the first sequence;
in response to a request to transition to a second sequence of coded video data, determine whether a destination frame of the request to transition aligns with a synchronization frame of the second sequence of coded video data;
when the destination frame does not align with a synchronization frame, wherein a synchronization frame is frame encoded without reference to any previously coded frame of the second sequence:
select from a plurality of eligible third sequences each third sequence including synchronization frames at staggered coding positions with respect to synchronization
frames of the other third sequences, a third sequence having a synchronization frame prior to and closest in coding position to the destination frame,
decode, from the selected third sequence, additional reference frame(s) of the second sequence including at least one synchronization frame that provide prediction reference(s) for the destination frame in the second sequence,
afterward, decode the second sequence of the coded video data starting at the destination frame, including decoding the destination frame using a prediction reference developed from the decoded additional reference frame (s).

19. The medium of claim 18, wherein the device receives the reference frames in a same transmission unit in which the destination frame is received.

20. The medium of claim 18, wherein the device receives the destination frame in an intermediate transmission unit, different from transmission units of the second sequence, and
the device's decode of the second sequence begins following completion of decoding of the intermediate transmission unit.

21. The medium of claim 18, wherein the destination frame is contained in a plurality of intermediate transmission units, each different from transmission units of the second sequence and having different starting points, and the device further:
selects one of the intermediate transmission units that a starting point that precedes the destination frame and whose starting point is closest to the destination frame, and
decodes the selected intermediate transmission unit.

22. The medium of claim 18, wherein the transmission units that have different starting points have common durations.

23. The medium of claim 18, wherein the transmission units that have different starting points have common end points.

24. The medium of claim 18, wherein at least one of the reference frames is contained in a transmission unit that is different from a transmission unit in which the destination frame is contained.

25. The medium of claim 18, wherein, responsive to a request to fast forward or rewind content of a currently-displayed sequence, the device further:
selects at least one of a plurality of channels including reference frames, each of the channels including reference frames that are staggered from the reference frames in the other channels and at least one of the channels includes the reference frames at a frequency that is higher than a frequency of the reference frames in the other channels, and
displays the reference frames from the selected channel.

26. The medium of claim 18, wherein the device determines timing of the additional reference frames in the transmission unit from manifest information describing the second video sequence.

27. The medium of claim 18, wherein the device receives the request to transition while content of the first sequence and the second sequence are displayed simultaneously, and the device switches modes of presentation of the first sequence and the second sequence in response to the request to transition.

28. The medium of claim 18, wherein the device replaces display of the first sequence with display of the second sequence in response to the request to transition.

* * * * *